US008918635B2

(12) United States Patent
Kim

(10) Patent No.: US 8,918,635 B2
(45) Date of Patent: Dec. 23, 2014

(54) APPARATUS AND METHOD FOR ACCESS CONTROL OF CONTENT IN DISTRIBUTED ENVIRONMENT NETWORK

(75) Inventor: Dae Youb Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 13/410,762

(22) Filed: Mar. 2, 2012

(65) Prior Publication Data
US 2012/0226902 A1 Sep. 6, 2012

(30) Foreign Application Priority Data

Mar. 2, 2011 (KR) ........................ 10-2011-0018664

(51) Int. Cl.
H04L 29/06 (2006.01)
H04L 9/32 (2006.01)
H04L 9/08 (2006.01)
H04L 9/06 (2006.01)
H04L 9/00 (2006.01)

(52) U.S. Cl.
CPC .............. H04L 9/088 (2013.01); H04L 9/3247 (2013.01); H04L 2209/60 (2013.01); H04L 9/0825 (2013.01); H04L 2209/38 (2013.01); H04L 9/0861 (2013.01); H04L 9/0643 (2013.01); H04L 9/008 (2013.01)
USPC ......................................................... 713/153

(58) Field of Classification Search
USPC .......................................... 713/153, 180, 176
See application file for complete search history.

(56) References Cited

U.S. PATENT DOCUMENTS

| 6,330,671 B1 * | 12/2001 | Aziz .............................. 713/163 |
| 2003/0142822 A1 | 7/2003 | Anzai |
| 2004/0123104 A1 * | 6/2004 | Boyen et al. .................. 713/165 |
| 2005/0226416 A1 * | 10/2005 | Jung et al. ..................... 380/228 |
| 2009/0300307 A1 | 12/2009 | Carbone et al. |
| 2010/0146589 A1 | 6/2010 | Safa |
| 2010/0235649 A1 | 9/2010 | Jeffries et al. |

FOREIGN PATENT DOCUMENTS

| JP | 07-253931 | 10/1995 |
| JP | 2003-24867 | 9/2003 |
| KR | 10-2010-0072881 A | 7/2010 |
| KR | 10-2010-0112724 A | 10/2010 |

* cited by examiner

Primary Examiner — Jason Gee
(74) Attorney, Agent, or Firm — NSIP Law

(57) ABSTRACT

An apparatus for generating a key for access control of content in a distributed environment network is provided. The apparatus includes a first key distributor configured to generate first encrypted keys by encrypting a first key corresponding to a key for write authorization using each public key of members having write authorization among members included in an access control list including information of at least one user and distribute the access control list and information about access authorization and the first encrypted keys to the members having write authorization, and a second key distributor configured to generate second encrypted keys by encrypting a second key corresponding to a key for read authorization using the first key using each public key of members having read authorization among members included in the access control list and distribute the access control list and second encrypted keys to the members having read authorization.

7 Claims, 6 Drawing Sheets

APPARATUS AND METHOD FOR ACCESS CONTROL OF CONTENT IN DISTRIBUTED ENVIRONMENT NETWORK

CROSS-REFERENCE TO RELATED APPLICATION(S)

This application claims the benefit under 35 U.S.C. §119(a) of Korean Patent Application No. 10-2011-0018664, filed on Mar. 2, 2011, in the Korean Intellectual Property Office, the entire disclosure of which is incorporated herein by reference for all purposes.

BACKGROUND

1. Field

The following description relates to an apparatus and a method for access control of content in a distributed environment network.

2. Description of Related Art

An access control of content based on an encryption technology may generally manage and control access authorization of the corresponding content based on whether a data encryption key (DEK) used for a content encryption is secured. A user securing the DEK may be considered to have read and access authorization in relation to the corresponding content.

Since a user having read and access authorization may previously secure the DEK or may generate the DEK, read and write authorizations may not be separately managed based on whether the DEK is secured.

Accordingly, an additional scheme for managing write authorization in a case of the access control of content based on an encryption technology may be desirable.

SUMMARY

In one general aspect, an apparatus for generating a key for access control of content in a distributed environment network is provided. The apparatus includes a first key distributor configured to generate first encrypted keys by encrypting a first key corresponding to a key for write authorization using each public key of members having write authorization among members included in an access control list including information of at least one user and information about access authorization and distribute the access control list and the first encrypted keys to the members having write authorization, and a second key distributor configured to generate second encrypted keys by encrypting a second key corresponding to a key for read authorization using the first key using each public key of members having read authorization among members included in the access control list and distribute the access control list and second encrypted keys to the members having read authorization.

The access control list may include identification information for identifying the access control list from other access control lists, information about a size of the access control list, information about a version of the access control list, information about an identification of each of members, information about access authorization of each of the members, information about a public key of each of the members, information about a signature of a generator generating the access control list, or any combination thereof.

The first key may be neither generated nor predicted using the second key.

The second key may be a result obtained by hashing the first key n times, the value of n being an integer greater than 0.

The first key distributor, the second key distributor, or any combination thereof may be implemented by a processor.

The apparatus may include a list generator to generate the access control list.

The apparatus may include a first key generator to generate the first key, and a second key generator to generate the second key.

In another aspect, an apparatus for generating content for an access control of content in a distributed environment network is provided. The apparatus includes a key decryption unit configured to secure a first key by decrypting a first encrypted key, encrypted by using a public key, using a secret key corresponding to the public key, an encryption key generator configured to generate an encryption key using a second key generated using the first key, a content encryption unit configured to generate an encrypted content by encrypting content using the encryption key, a signature generator configured to generate a signature using the first key, a content and a signature key in response to members included in an access control list having write authorization as a result of checking access authorization of the members, and a distributor configured to distribute the encrypted content and the signature through a network.

The encryption key generator may generate the encryption key using information of the content and the second key.

The first key may correspond to a key for write authorization and may be neither generated nor predicted using the second key.

The second key may correspond to a key for read authorization and may be a result obtained by hashing the first key n times, the value of n being an integer greater than 0.

The signature generator may generate the signature using a value obtained by hashing the first key m times, a value obtained by hashing the content, and the signature key, the distributor may distribute a value of the m in addition to the encrypted content and the signature and the value m may correspond to a random value less than n corresponding to a number of times the first key is hashed to generate the second key.

The signature generator may generate the signature using an algorithm having a one-way homomorphic characteristic.

The signature key may be generated based on a Rivest Shamir Adleman (RSA) encryption scheme.

In another aspect, an apparatus for verification of content for an access control of content in a distributed environment network is provided. The apparatus includes a receiver configured to receive an encrypted content, a signature of the encrypted content, and an access control list, and to receive a second encrypted key from a network in response to the apparatus being determined to have read authorization as a result of checking the access control list, a key decryption unit configured to secure a second key by decrypting the second encrypted key, encrypted by using a public key, using a secret key corresponding to the public key in response to the apparatus being determined to have read authorization as a result of checking the access control list, a signature verification unit configured to verify the signature using the second key and the encrypted content, a decryption key generator configured to generate a decryption key using the second key in response to the signature verification being successful, and a content decryption unit configured to decrypt the encrypted content using the decryption key.

The apparatus may include a second key generator configured to generate the second key using a first key. The receiver may receive a first encrypted key from the network, and the key decryption unit may secure the first key by decrypting the first encrypted key using the secret key in response to the apparatus being determined to have write authorization as a result of checking the access control list.

The first key may correspond to a key for write authorization and may be neither generated nor predicted using the second key.

The second key may correspond to a key for read authorization and may be a result obtained by hashing the first key n times, the value of n being an integer greater than 0.

In another aspect, a method for an access control of content in an apparatus for generating a key of a distributed environment network is provided. The method includes generating a second key corresponding to a key for read authorization using a first key corresponding to a key for write authorization, generating first encrypted keys by encrypting the first key using each public key of members having write authorization among members included in an access control list including information of at least one user and information about access authorization, distributing the access control list and the first encrypted keys to the members having write authorization, generating second encrypted keys by encrypting the second key using each public key of members having read authorization among members included in the access control list, and distributing the access control list and the second encrypted keys to the members having read authorization.

In another aspect, a method for an access control of content in an apparatus for generating content of a distributed environment network is provided. The method includes requesting and receiving an access control list and a first encrypted key from a network, securing a first key corresponding to a key for write authorization by decrypting the first encrypted key, encrypted by using a public key, using a secret key corresponding to the public key in response to the apparatus being determined to have write authorization as a result of checking the access control list, generating an encryption key using information of a content and a second key corresponding to a key for read authorization using the first key, generating an encrypted content by encrypting content using the encryption key, generating a signature using the first key, the content, and a signature key, and distributing the encrypted content and the signature through the network.

The generating of the signature may include generating the signature using a value obtained by hashing the first key m times, a value obtained by hashing the content and the signature key, the distributing may include distributing a value of the m in addition to the encrypted content and the signature, and the value m may correspond to a random value less than n corresponding to a number of times the first key is hashed to generate the second key, the value of n being an integer greater than 0.

The generating of the signature may include generating the signature using an algorithm having a one-way homomorphic characteristic.

In another aspect, a method for an access control of content in an apparatus for verification of content of a distributed environment network is provided. The method includes checking access authorization of an encrypted content in an access control list to verify access requirements are satisfied, securing a second key corresponding to a key for read authorization in response to the encrypted content being determined to be accessible as a result of the verification, verifying a signature of the encrypted content using the second key and the encrypted content, generating a decryption key using the second key in response to the signature verification being successful, and decrypting the encrypted content using the decryption key.

The securing may include receiving a second encrypted key from the network in response to the apparatus being determined to have read authorization as a result of checking the access control list, and securing a second key by decrypting the second encrypted key, encrypted by using a public key, using a secret key corresponding to the public key. The securing may include receiving a first encrypted key from the network in response to the apparatus being determined to have write authorization as a result of checking the access control list, securing a first key by decrypting the first encrypted key, encrypted by using a public key, using a secret key corresponding to the public key, and generating the second key using the first key.

Other features and aspects may be apparent from the following detailed description, the drawings, and the claims.

Figure 1:
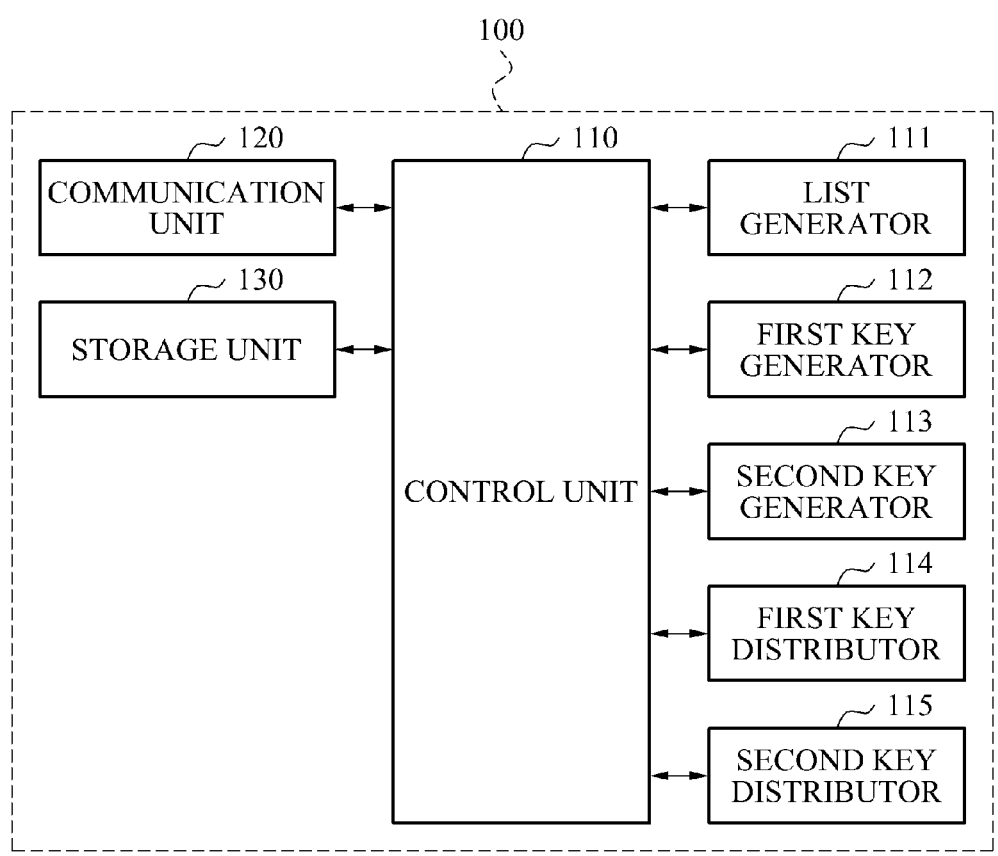
FIG. 1 is a diagram illustrating an example of an apparatus for generating a key for an access control of content in a distributed environment network.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Examples relate to an apparatus for generating a key, an apparatus for generating content, and an apparatus for verification of content for separately controlling read authorization and write authorization with respect to content and a method thereof in a distributed environment network.

FIG. 1 includes an example of an apparatus for generating a key 100 for an access control of content in a distributed environment network.

Referring to FIG. 1, the apparatus for generating a key 100 may include a control unit 110, a communication unit 120, a storage unit 130, a list generator 111, a first key generator 112, a second key generator 113, a first key distributor 114, and a second key distributor 115.

The communication unit 120 may transmit and receive data through a wired and/or a wireless network. In this instance, the network may correspond to a content centric network (CCN) or a named data network (NDN).

The storage unit 130 may store an operating system, an application program, and data for controlling an operation of the apparatus for generating a key 100. The storage unit 130 may store an access control list generated by the list generator 111, a first key generated by the first key generator 112 and a second key generated by the second key generator 113.

The access control list may includes information of at least one user and information relating to access authorization.

In this instance, the access control list may include identification information for identifying the access control list from other access control lists, information about a size of the access control list, information about a version of the access control list, information about an identification of each of the members, information about access authorization of each of the members, information about a public key of each of the members, information about a signature of a generator generating the access control list, or any combination thereof.

A structure of the access control list may be as shown in the following Table 1.

TABLE 1

| | Structure | |
|---|---|---|
| Name | Size | Option Flag |
| Version (optional) | Nonce (optional) | Index (optional) |
| Principal[1] | Principal[1]'s rights | Key Link[1] |
| * * * | | |
| Principal[n] | Principal[n]'s rights | Key Link[n] |
| Signature | | |

In Table 1, Name relates to identification information for identifying an access control list, Size relates to a number of Principals or a size of the access control list, Option Flag relates to identification information for identifying optional components, Version relates to a time stamp, Nonce relates to a random value for generating an encryption key, Index relates to information of a hash key, Principal[i] relates to identification information of a user or a user group, Principal[i]'s rights relate to information about access authorization assigned to the Principal[i], Key Link[i] relates to identification information of a key assigned to the Principal[i] and Signature relates to a signature of a generator of the access control list.

The first key generator 112 may generate a first key. The first key may correspond to a key for write authorization.

The second key generator 113 may generate a second key. The second key may correspond to a key for read authorization using the first key. The second key generator 113 may be generated based on the following Equation 1.

$$K = H^n(NK)$$ [Equation 1]

In Equation 1, K relates to the second key for read authorization, NK relates to the first key for write authorization, H( ) relates to a hash function, and $H^n($ ) relates to performing a hash n times. N may be an integer greater than zero.

The first key may be neither generated nor predicted using the second key.

The first key distributor 114 may generate first encrypted keys by encrypting the first key using each public key of members having write authorization. The members having write authorization may be included in the access control list. The first key distributor 114 may distribute the access control list and the first encrypted keys to the members having write authorization.

The second key distributor 115 may generate second encrypted keys by encrypting the second key using each public key of members having read authorization. The members having read authorization may be included in the access control list. The second key distributor 115 may distribute the access control list and second encrypted keys to the members having read authorization.

The control unit 110 may control an overall operation of the apparatus for generating a key 100. The control unit 110 may function as the list generator 111, the first key generator 112, the second key generator 113, the first key distributor 114, and the second key distributor 115. The control unit 110, the list generator 111, the first key generator 112, the second key generator 113, the first key distributor 114, and the second key distributor 115 are separately illustrated to separately describe each function. Furthermore, the control unit 110 may include at least one processor to function as an entire or a portion of the list generator 111, the first key generator 112, the second key generator 113, the first key distributor 114, and the second key distributor 115.

In response to authorization of a user included in the access control list being changed or deleted, the apparatus for generating a key 100 may newly generate and distribute a first key and a second key. In this instance, a user whose authorization is deleted may not use content generated after deletion of authorization. As another aspect, content generated and distributed before deletion of authorization of the user may be continued to be used by the user.

In response to a new user being added to the access control list, the apparatus for generating a key 100 may newly encrypt and distribute a key corresponding to authorization assigned to the added user. The key corresponding to authorization assigned to the added user may be encrypted and distributed using a public key of the added user.

Figure 2:
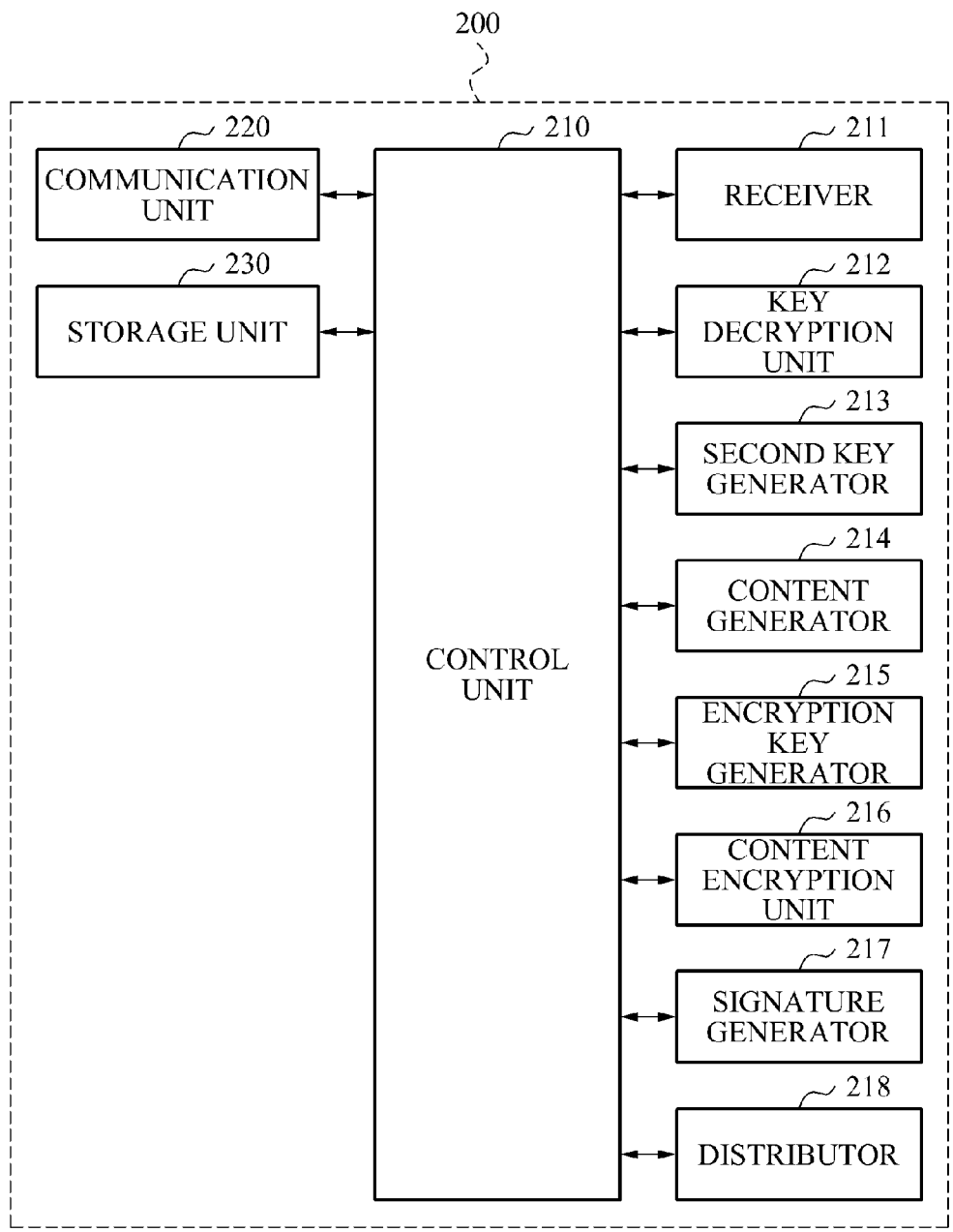
FIG. 2 is a diagram illustrating an example of an apparatus for generating content for an access control of content in a distributed environment network.

FIG. 2 includes an example of an apparatus for generating content 200 for an access control of content in a distributed environment network.

Referring to FIG. 2, the apparatus for generating content 200 may include a control unit 210, a communication unit 220, a storage unit 230, a receiver 211, a key decryption unit 212, a second key generator 213, a content generator 214, an encryption key generator 215, a content encryption unit 216, a signature generator 217, and a distributor 218.

The communication unit 220 may transmit and receive data through a wired and/or wireless network. In this instance, the network may correspond to a CCN or an NDN.

The storage unit 230 may store an operating system, an application program, and data for controlling an overall operation of the apparatus for generating content 200. The storage unit 230 may store an access control list received through the receiver 211, a first key decrypted by the key decryption unit 212 and a second generated by the second key generator 213.

The receiver 211 may request and receive an access control list from a network. The receiver 211 may request and receive a first encrypted key from the network.

The key decryption unit 212 may secure a first key corresponding to a key for write authorization by decrypting the first encrypted key using a secret key corresponding to the public key. The first encrypted key may be encrypted by using a public key.

The second key generator 213 may generate a second key. The second key may be generated using the first key and may correspond to a key for read authorization.

The content generator 214 may generate content.

The encryption key generator 215 may generate an encryption key. The encryption key may be generated using the second key. In another example, the encryption key may be generated using information of the content and the second key. In this instance, the encryption key generator 215 may generate the encryption key based on the following Equation 2.

$$DEK=KGF(K, \text{Content Inform}) \quad \text{[Equation 2]}$$

In Equation 2, DEK relates to an encryption key, KGF( ) relates to a function for generating an encryption key, K relates to the second key for read authorization, and Content Inform relates to information of content.

The content encryption unit 216 may encrypt content using the encryption key to generate an encrypted content.

In response to members included in the access control list having write authorization as a result of checking access authorization of the members included in the access control list, the signature generator 217 may generate a signature using the first key, the content, a signature key, or any combination thereof. In this instance, the signature generator 217 may generate the signature using an algorithm which has a one-way homomorphic characteristic. As another aspect, the signature generator 217 may generate the signature based on the following Equation 3.

$$\text{Sig}=\text{Signature}(F(H^m(NK), H(C)), \text{signature key}) \quad \text{[Equation 3]}$$

In Equation 3, Signature( ) relates to a function for generating a signature, F( ) relates to a function which has a one-way homomorphic characteristic, C relates to an encrypted content, NK relates to the first key, m relates to a random value less than n corresponding to a parameter used for generating the second key and n relates to a number of times the first key is hashed to generate the second key and may be an integer greater than 0.

In response to a Rivest Shamir Adleman (RSA) encryption scheme being used, the signature generator 217 may generate a signature key based on Equation 4.

$$\text{Sig}=(H^m(NK*h))^d \quad \text{[Equation 4]}$$

In Equation 4, h relates to H(C), C relates to an encrypted content, H( ) relates to a function having a one-way homomorphic characteristic, d relates to a signature key, NK relates to the first key, m relates to a random value less than n corresponding to a parameter used for generating the second key, n relates to a number of times the first key is hashed to generate the second key, and $H^m$( ) relates to performing a hash m times.

Depending on the one-way homomorphic characteristic of H( ) in Equation 4, the following Equation 5 may be satisfied.

$$(H^m(NK*h))^d=(H^m(NK) \cdot H^m(h))^d \quad \text{[Equation 5]}$$

The one-way homomorphic characteristic may have the following three characteristics.

First, even though F(X) may be easily evaluated for a given X, X may be difficult to be evaluated from F(X). F(X) may have the one-way homomorphic characteristic.

Secondly, $F(A*B)=F(A) \cdot F(B)$.

Thirdly, $F(X)^{-1}$ may be difficult to be evaluated.

The distributor 218 may distribute the encrypted content and the signature through the network.

The control unit 210 may control an operation of the apparatus for generating content 200. The control unit 210 may function as the receiver 211, the key decryption unit 212, the second key generator 213, the content generator 214, the encryption key generator 215, the content encryption unit 216, the signature generator 217 and the distributor 218. The control unit 210, the receiver 211, the key decryption unit 212, the second key generator 213, the content generator 214, the encryption key generator 215, the content encryption unit 216, the signature generator 217 and the distributor 218 are separately illustrated to separately describe each function. Thus, the control unit 210 may include at least one processor to function as an entire or a portion of the receiver 211, the key decryption unit 212, the second key generator 213, the content generator 214, the encryption key generator 215, the content encryption unit 216, the signature generator 217, and the distributor 218.

Figure 3:
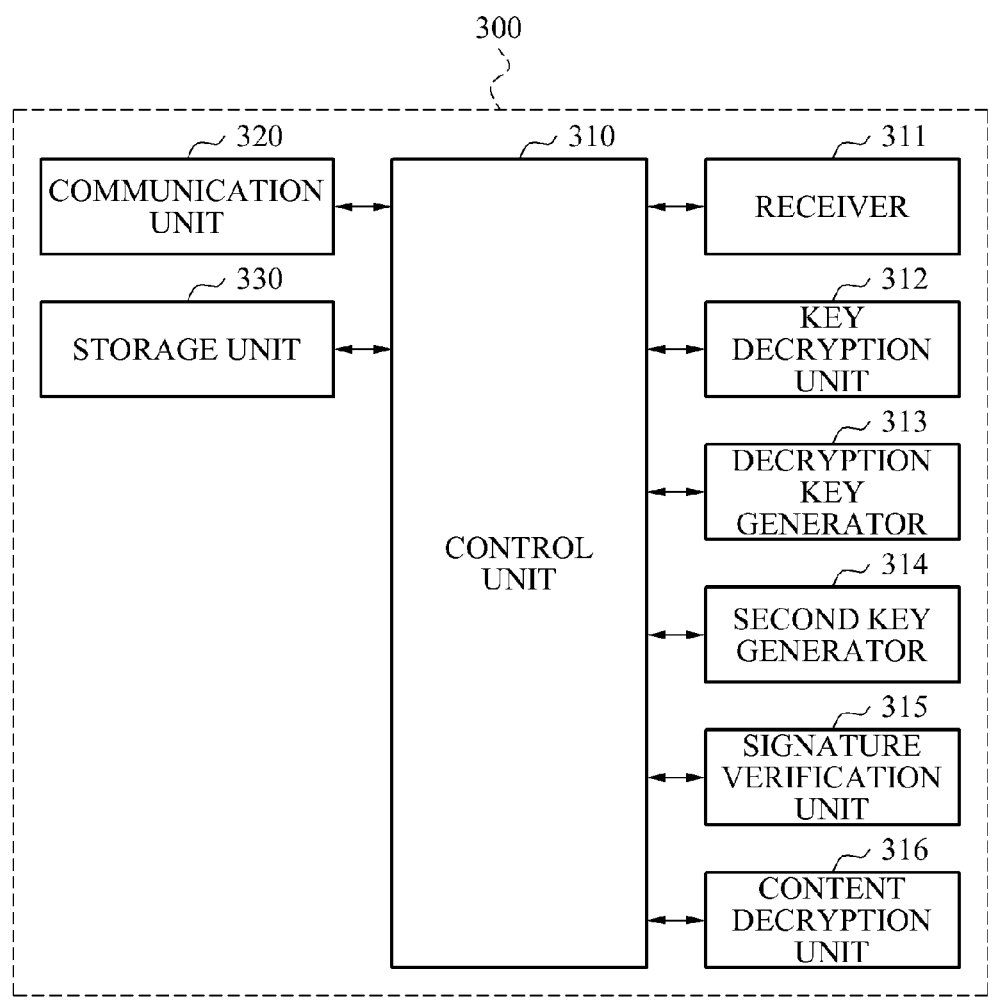
FIG. 3 is a diagram illustrating an example of an apparatus for verification of content for an access control of content in a distributed environment network.

FIG. 3 includes an example of an apparatus for verification of content 300 for an access control of content in a distributed environment network.

Referring to FIG. 3, the apparatus for verification of content 300 may include a control unit 310, a communication unit 320, a storage unit 330, a receiver 311, a key decryption unit 312, a decryption key generator 313, a second key generator 314, a signature verification unit 315, and a content decryption unit 316.

The communication unit 320 may transmit and receive data through a wired and/or wireless network. In this instance, the network may correspond to a CCN or an NDN.

The storage unit 330 may store an operating system, an application program and data for storage for controlling an overall operation of the apparatus for verification of content 300. The storage unit 330 may store an access control list, a first key and a second key.

The receiver 311 may receive an encrypted content, a signature of the encrypted content and an access control list. That is, in response to the receiver 311 being determined to have write authorization as a result of verification of the access control list, the receiver 311 may receive a first encrypted key from the network. Further, in response to the receiver 311 being determined to have read authorization as a result of verification of the access control list, the receiver 311 may receive a second encrypted key from the network.

In response to the receiver 311 receiving the first encrypted key or the second encrypted key, the key decryption unit 312 may decrypt the first encrypted key or the second encrypted key using a secret key. The secret key may correspond to a public key.

The second key generator 314 may generate the second key. The second key may correspond to a key for read authorization using the first key. In this instance, the second key may be generated based on Equation 1.

The signature verification unit 315 may verify a signature using the second key and the encrypted content. The signature verification unit 315 may perform verification based on the following Equation 6.

$$\text{Verify}(\text{Sig}, n, m, K, H(C), \text{signature verification key}) \quad \text{[Equation 6]}$$

In Equation 6, Verify( ) relates to a function for verifying a signature, Sig relates to a signature, K relates to the second key corresponding to a key for read authorization, H( ) relates to a hash function, m relates to a random value less than n corresponding to a parameter used for generating the second key, and n relates to a number of times the first key to is hashed to generate the second key. The value of n may be an integer greater than 0.

In response to the signature generator 217 generating a signature key using a Rivest Shamir Adleman (RSA) encryption scheme such as Equation 4, the signature verification unit 315 may verify a signature based on the following Equation 7.

$$A = Sig^e = ((H^m(NK*h))^d)^e = H^m(NK*h) = H^m(NK) \cdot H^n(h)$$

$$A' = H^{n-m}(A) = H^n(NK) \cdot H^n(h)$$

$$B = K \cdot H^n(h) \quad \text{[Equation 7]}$$

If A'=B, Sig is valid
If A'≠B, Sig is invalid

In Equation 7, Sig relates to a signature, NK relates to the first key, K relates to the second key corresponding to a key for read authorization, h relates to H(C), C relates to an encrypted content, H( ) relates to a hash function which has a one-way homomorphic characteristic, d relates to a signature key, e relates to a signature verification key, m relates to a random value less than n corresponding to a parameter used for generating the second key, and n relates to a number of times the first key is hashed to generate the second key. The value of n may be an integer greater than 0.

In response to the RSA encryption scheme such as Equation 4 being used, the signature verification unit 315 may calculate A' using a received signature, calculate B using K and the received encrypted content, and determine whether the verification is successful by comparing A' to B. K may correspond to the second key of the signature verification unit 315.

A signature scheme using the signature generator 217 and the signature verification unit 315 may be satisfactory for security, for the reasons discussed below. Since a user having read authorization may have information of $K=H^n(NK)$ and m<n, $H^m(NK)$ used for generating Sig may not be evaluated using information of K due to a one-way homomorphic characteristic. Even though $Sig^e = H(NK)^{me} \times H(C)$ is secured in a verification operation, a signature key k of a user having write authorization may be used to secure $H^m(NK)$. Thus, a valid signature may not be generated without collaboration from the user having write authorization.

In response to the signature verification succeeding, the decryption key generator 313 may generate a decryption key based on the second key. In another aspect, the decryption key generator 313 may generate the decryption key using information of content and the second key. The generation of the decryption key may be based on the same scheme as the encryption key generator 215. The decryption key generator 313 may use the encryption key generated based on Equation 2 as the decryption key.

The content decryption unit 316 may use the decryption key to decrypt the encrypted content.

The control unit 310 may control an overall operation of the apparatus for verification of content 300. The control unit 310 may function as the key decryption unit 312, the decryption key generator 313, the second key generator 314, the signature verification unit 315, and the content decryption unit 316. The control unit 310, the key decryption unit 312, the decryption key generator 313, the second key generator 314, the signature verification unit 315, and the content decryption unit 316 are separately illustrated to describe the function of each. Thus, the control unit 310 may include at least one processor configured to function as an entire or a portion of the key decryption unit 312, the decryption key generator 313, the second key generator 314, the signature verification unit 315, and the content decryption unit 316.

Hereinafter, an example of a method for an access control of content in a distributed environment network will be described with reference to FIG. 4 through FIG. 6.

Figure 4:
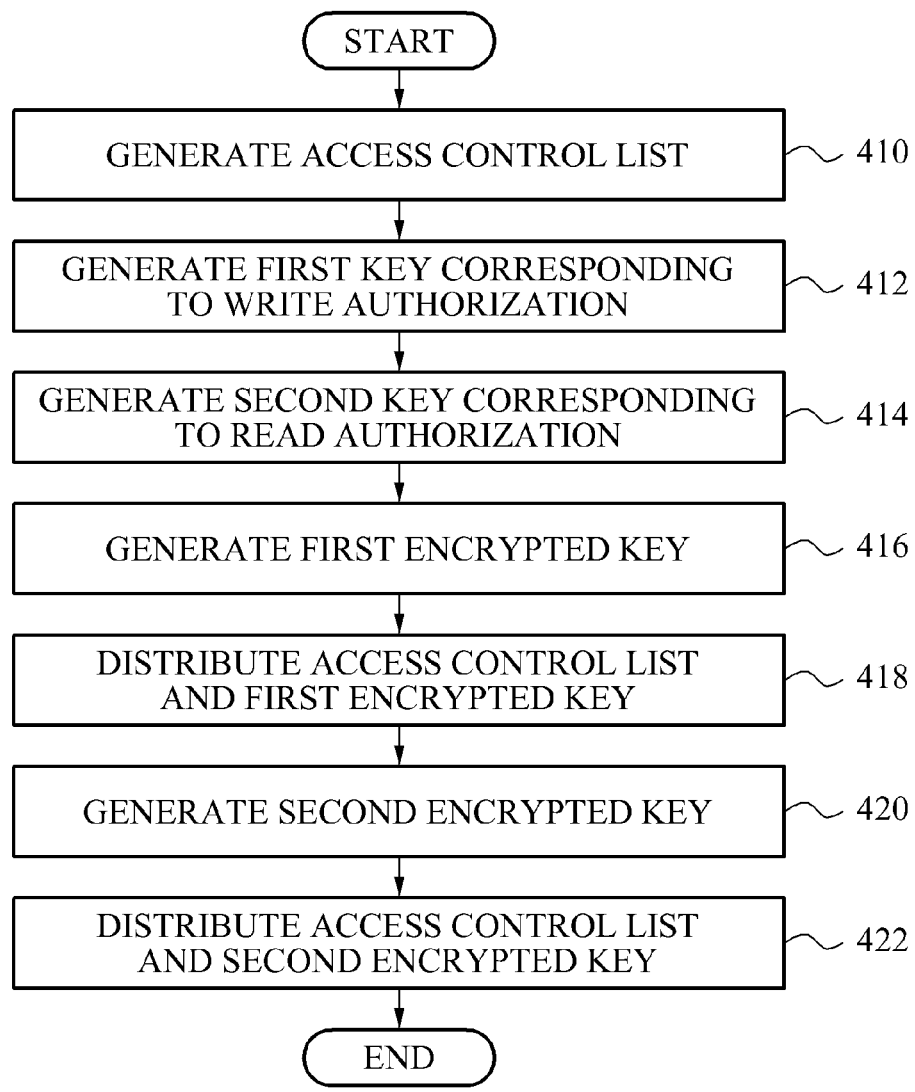
FIG. 4 is a flowchart illustrating an example of a process of generating an access control list for an access control of content and separately generating and distributing a key between write authorization and read authorization in an apparatus for generating a key in a distributed environment network.

FIG. 4 illustrates an example of a process for generating an access control list for an access control of content and separately generating and distributing a key between write authorization and read authorization in an apparatus for generating a key 100 in a distributed environment network.

Referring to FIG. 4, in operation 410, the apparatus for generating a key 100 may generate an access control list. The access control list may include information of at least one user and information about access authorization.

In operation 412, the apparatus for generating a key 100 may generate a first key. The first key may correspond to a key for write authorization.

In operation 414, the apparatus for generating a key 100 may generate a second key. The second key may correspond to a key for read authorization using the first key.

In operation 416, the apparatus for generating a key 100 may encrypt the first key using each public key of members having write authorization among members to generate first encrypted keys. The members having write authorization among members may be included in the access control list.

In operation 418, the apparatus for generating a key 100 may distribute the access control list and the generated first encrypted keys to the members having write authorization.

In operation 420, the apparatus for generating a key 100 may encrypt the second key using each public key of members having read authorization among members to generate second encrypted keys. The members having read authorization among members may be included in the access control list.

In operation 422, the apparatus for generating a key 100 may distribute the access control list and the second encrypted keys to the members having read authorization.

Figure 5:
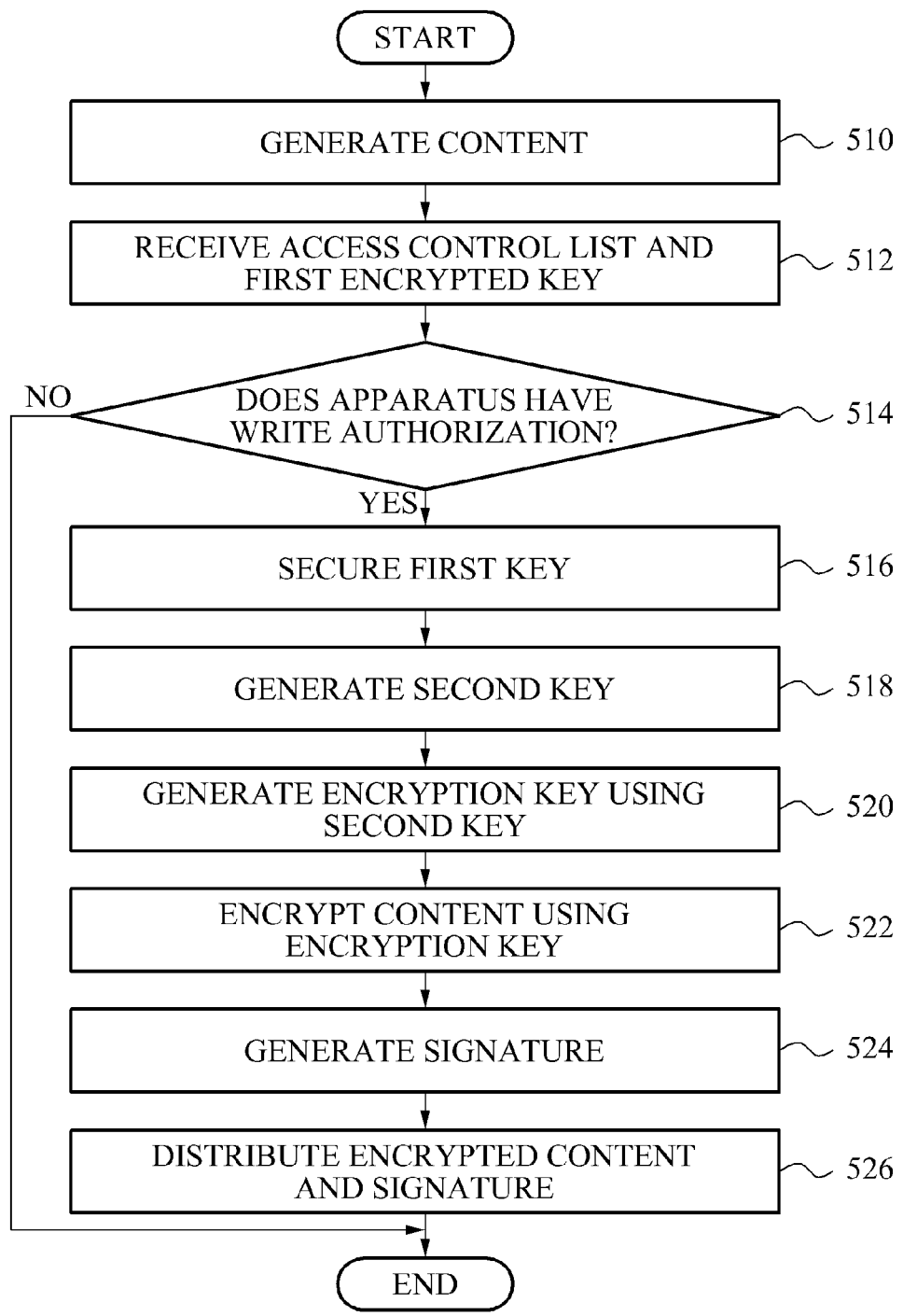
FIG. 5 is a flowchart illustrating an example of a process of generating and distributing content for an access control of content in an apparatus for generating content in a distributed environment network.

FIG. 5 illustrates an example of a process for generating and distributing content for an access control of content in an apparatus for generating content 200 in a distributed environment network.

Referring to FIG. 5, in operation 510, the apparatus for generating content 200 may generate content.

In operation 512, the apparatus for generating content 200 may request and receive an access control list and a first encrypted key from a network.

In operation 514, the apparatus for generating content 200 may verify whether the apparatus for generating content 200 has write authorization by checking access authorization of members based on the access control list.

In operation 516, the apparatus for generating content 200 may decrypt the first encrypted key to secure a first key corresponding to a key for write authorization using a secret key in response to the apparatus for generating content 200 being determined to have write authorization as a result of the verification in operation 514. The first encrypted key may be encrypted using a public key. The secret key may correspond to the public key.

In operation 518, the apparatus for generating content 200 may generate a second key corresponding to a key for read authorization using the first key.

In operation 520, the apparatus for generating content 200 may generate an encryption key using information of the content and the second key.

In operation 522, the apparatus for generating content 200 may encrypt content using the encryption key to generate an encrypted content.

In operation 524, the apparatus for generating content 200 may generate a signature using a value. The value may be obtained by hashing the first key m times, a value obtained by hashing the content, and the signature key. In this instance, the value m may correspond to a random value less than n corresponding to a number of times the first key is hashed to generate the second key. The value n may be an integer greater than 0.

In operation 526, the apparatus for generating content 200 may distribute the encrypted content, the signature, and the value m through the network.

Figure 6:
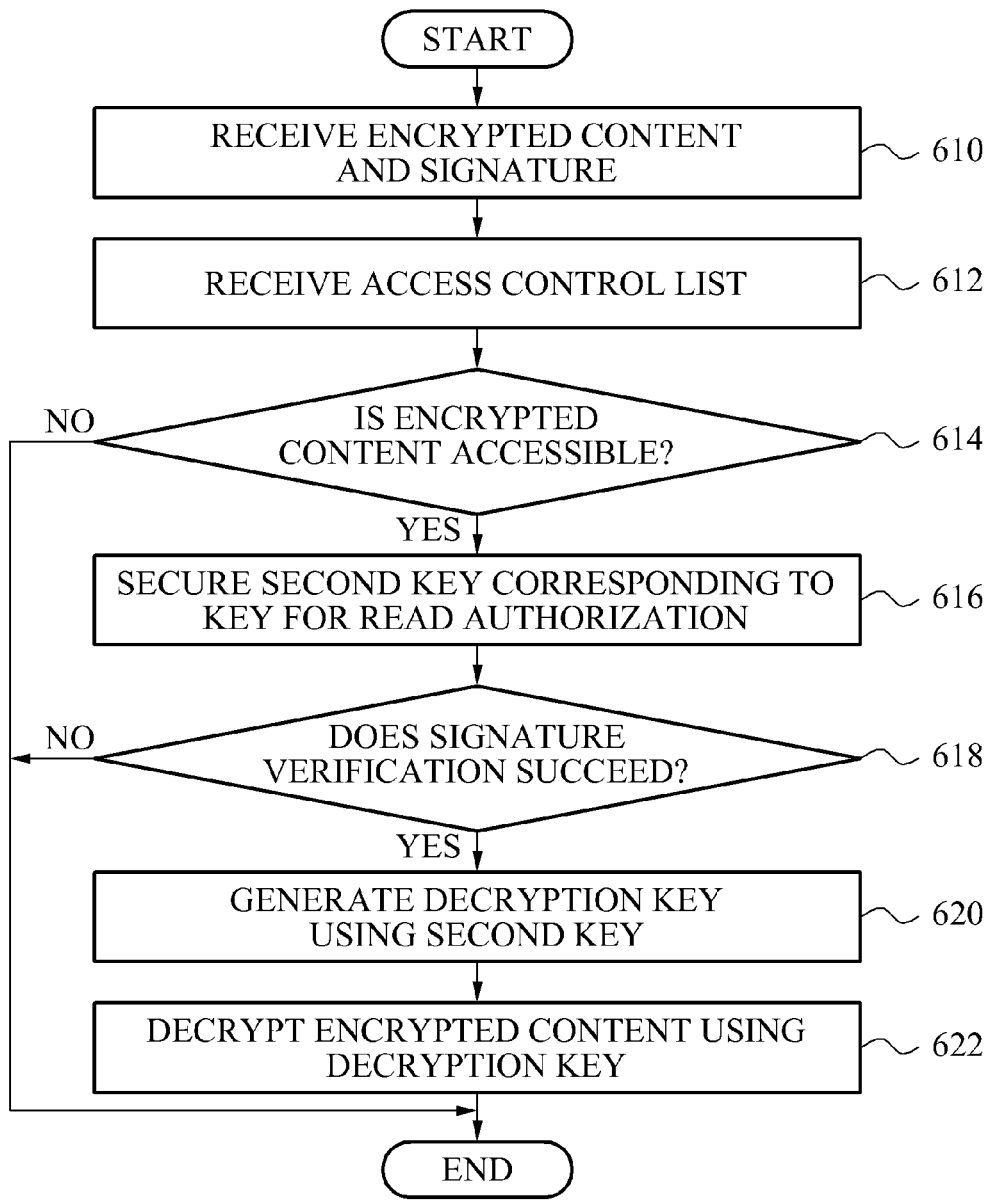
FIG. 6 is a flowchart illustrating an example of a process of verifying content where access to content is controlled in an apparatus for verification of content in a distributed environment network.

FIG. 6 includes an example of a process for verifying content where access to content is controlled in an apparatus for verification of content in a distributed environment network.

Referring to FIG. 6, in operation 610, an apparatus for verification of content 300 may receive an encrypted content and a signature of the encrypted content.

In operation 612, the apparatus for verification of content 300 may receive an access control list from a network.

In operation 614, the apparatus for verification of content 300 may check access authorization of the encrypted content in the access control list to verify satisfaction of access requirements.

In operation 616, the apparatus for verification of content 300 may secure a second key in response to the encrypted content being determined to be accessible as a result of the verification in operation 614. The second key may correspond to a key for read authorization.

In operation 616, the apparatus for verification of content 300 may receive a second encrypted key from the network in response to the apparatus for verification of content 300 being determined to have read authorization as a result of checking the access control list. The apparatus for verification of content 300 may decrypt the second encrypted key to secure a second key using a secret key. The second encrypted key may be encrypted by using a public key. The secret key may correspond to the public key.

In operation 616, the apparatus for verification of content 300 may receive a first encrypted key from the network in response to the apparatus for verification of content 300 being determined to have write authorization as a result of checking the access control list, secure a first key by decrypting the first encrypted key using a secret key, and generate the second key using the first key. The first encrypted key may be encrypted by using a public key. The secret key may correspond to the public key.

In operation 618, the apparatus for verification of content 300 may verify the signature using the second key and the encrypted content, and check whether the signature verification is successful.

In operation 620, the apparatus for verification of content 300 may generate a to decryption key using the second key in response to the signature verification being determined to succeed as a result of the verification in operation 618. In this instance, the decryption key may be identical to the decryption key generated by the apparatus for generating content 200.

In operation 622, the apparatus for verification of content 300 may decrypt the encrypted content using the decryption key.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and to software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for generating a key for access control of content in a distributed environment network, the apparatus comprising:
   a first key distributor configured to generate first encrypted keys by encrypting a first key corresponding to a key for write authorization using each public key of members having write authorization among members included in an access control list including information of at least one user and information about access authorization and distribute the access control list and the first encrypted keys to the members having write authorization; and
   a second key distributor configured to generate second encrypted keys by encrypting a second key corresponding to a key for read authorization, using each public key of members having read authorization among members included in the access control list and distribute the access control list and second encrypted keys to the members having read authorization,
   wherein the second key is generated using the first key, and the first key is neither generated nor predicted using the second key.

2. The apparatus of claim 1, wherein the access control list includes identification information for identifying the access control list from other access control lists, information about a size of the access control list, information about a version of the access control list, information about an identification of each of members, information about access authorization of each of the members, information about a public key of each of the members, information about a signature of a generator generating the access control list, or any combination thereof.

3. The apparatus of claim 1, wherein the second key is a result obtained by hashing the first key n times, the value of n being an integer greater than 0.

4. The apparatus of claim 1, wherein the first key distributor, the second key distributor, or any combination thereof is implemented by a processor.

5. The apparatus of claim 1, further comprising a list generator configured to generate the access control list.

6. The apparatus of claim 1, further comprising:
    a first key generator configured to generate the first key; and
    a second key generator configured to generate the second key.

7. A method for an access control of content in an apparatus for generating a key of a distributed environment network, the method comprising:
    generating a second key corresponding to a key for read authorization using a first key corresponding to a key for write authorization;
    generating first encrypted keys by encrypting the first key using each public key of members having write authorization among members included in an access control list including information of at least one user and information about access authorization;
    distributing the access control list and the first encrypted keys to the members having write authorization;
    generating second encrypted keys by encrypting the second key using each public key of members having read authorization among members included in the access control list; and
    distributing the access control list and the second encrypted keys to the members having read authorization,
    wherein the first key is neither generated nor predicted using the second key.

* * * * *